(12) United States Patent
Roach et al.

(10) Patent No.: US 9,840,319 B2
(45) Date of Patent: Dec. 12, 2017

(54) SUPERPRESSURE BALLOON ENVELOPE CAGE STRUCTURE AND RIGGING TECHNIQUE

(71) Applicant: X Development LLC, Mountain View, CA (US)

(72) Inventors: Kevin Roach, Mountain View, CA (US); Pamela Desrochers, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 281 days.

(21) Appl. No.: 14/722,354

(22) Filed: May 27, 2015

(65) Prior Publication Data

US 2015/0266559 A1    Sep. 24, 2015

Related U.S. Application Data

(63) Continuation of application No. 13/941,674, filed on Jul. 15, 2013, now Pat. No. 9,067,666.

(51) Int. Cl.
*B64B 1/02* (2006.01)
*B64B 1/40* (2006.01)
*B64B 1/42* (2006.01)

(52) U.S. Cl.
CPC . *B64B 1/40* (2013.01); *B64B 1/42* (2013.01)

(58) Field of Classification Search
CPC ........ B64C 2201/022; B64C 2201/101; B64C 25/56; B64B 1/50; B64B 1/62; B64B 1/00; B64B 1/06; B64B 1/40; B64B 1/42; B64B 1/02; B64B 2201/00
See application file for complete search history.

(56) References Cited

U.S. PATENT DOCUMENTS

| | | | | |
|---|---|---|---|---|
| 1,477,338 A * | 12/1923 | Finley | ................ | B64B 1/00 244/30 |
| 1,671,922 A * | 5/1928 | Avorio | ................ | B64B 1/00 244/33 |
| 2,730,626 A * | 1/1956 | Varney | ................ | G01T 7/02 137/81.1 |
| 2,767,940 A * | 10/1956 | Melton | ................ | B64B 1/40 156/100 |
| 2,919,082 A * | 12/1959 | Winzen | ................ | B64B 1/58 24/462 |
| 3,120,932 A * | 2/1964 | Stahmer | ................ | B64B 1/00 244/2 |

(Continued)

FOREIGN PATENT DOCUMENTS

WO    2011042316    4/2011

*Primary Examiner* — Medhat Badawi
(74) *Attorney, Agent, or Firm* — McDonnell Boehnen Hulbert & Berghoff LLP

(57) ABSTRACT

A balloon apparatus is provided having (1) a cage structure that includes (a) a plurality of vertical tendons, where each of the vertical tendons includes a first end and second end, where the first ends of the vertical tendons are all connected to one another and where the second ends of the vertical tendons are all connected to one another and (b) one or more horizontal tendons, where each horizontal tendon is attached to each of the vertical tendons at a corresponding level of the cage structure and (2) a balloon envelope, where the balloon envelop is arranged inside the cage structure and inflatable within the cage structure.

12 Claims, 10 Drawing Sheets

(56) References Cited

U.S. PATENT DOCUMENTS

| | | | | |
|---|---|---|---|---|
| 3,260,480 A * | 7/1966 | Ash | B64B 1/62 | 244/31 |
| 3,270,908 A * | 9/1966 | Faget | B64G 1/12 | 220/560.05 |
| 3,976,265 A * | 8/1976 | Doolittle | B64B 1/00 | 212/71 |
| 4,366,936 A * | 1/1983 | Ferguson | B64B 1/00 | 244/127 |
| 4,434,958 A * | 3/1984 | Rougeron | B64B 1/00 | 244/126 |
| 4,773,617 A * | 9/1988 | McCampbell | B64B 1/60 | 244/128 |
| 4,931,028 A * | 6/1990 | Jaeger | A63H 27/10 | 244/30 |
| 5,082,205 A * | 1/1992 | Caufman | B64C 37/02 | 244/2 |
| 5,104,059 A * | 4/1992 | Rand | B64B 1/42 | 244/126 |
| 5,579,609 A * | 12/1996 | Sallee | B64G 9/00 | 156/156 |
| 5,813,627 A * | 9/1998 | Huntington | B64B 1/50 | 244/146 |
| 6,142,414 A * | 11/2000 | Doolittle | B64B 1/06 | 244/2 |
| 6,227,484 B1 * | 5/2001 | Miyake | B64B 1/50 | 244/115 |
| 6,360,988 B1 * | 3/2002 | Monroe | B64B 1/70 | 244/31 |
| 6,547,189 B1 * | 4/2003 | Raboin | B64G 1/12 | 244/158.3 |
| 6,565,037 B1 * | 5/2003 | Tonkovich | B64B 1/06 | 244/24 |
| 6,685,136 B2 * | 2/2004 | Yajima | B64B 1/58 | 244/31 |
| 7,055,777 B2 * | 6/2006 | Colting | B64B 1/02 | 244/30 |
| 7,156,342 B2 * | 1/2007 | Heaven, Jr. | B64B 1/60 | 244/125 |
| 7,173,649 B1 * | 2/2007 | Shannon | B64B 1/22 | 244/102 R |
| 7,287,724 B2 * | 10/2007 | Hase | B64B 1/50 | 244/30 |
| 7,341,224 B1 * | 3/2008 | Osann, Jr. | B64C 39/028 | 244/30 |
| 7,464,895 B2 * | 12/2008 | Palmer | B64B 1/14 | 244/30 |
| 7,913,948 B2 * | 3/2011 | Porter | B64B 1/06 | 244/126 |
| 8,167,236 B2 * | 5/2012 | Jess | B64B 1/36 | 244/29 |
| 8,186,625 B2 * | 5/2012 | De Jong | B64G 1/222 | 244/158.3 |
| 8,267,348 B2 * | 9/2012 | Alavi | B64B 1/60 | 244/30 |
| 8,882,026 B2 * | 11/2014 | Huens | B64D 17/02 | 244/31 |
| 9,221,531 B1 * | 12/2015 | Brookes | B64B 1/62 | |
| 9,611,045 B2 * | 4/2017 | Erickson | B64D 25/00 | |
| 9,694,910 B2 * | 7/2017 | MacCallum | B64D 17/64 | |
| 2002/0109045 A1 * | 8/2002 | Beach | B64B 1/00 | 244/33 |
| 2005/0288114 A1 * | 12/2005 | Meadows | A63G 31/00 | 472/134 |
| 2007/0102570 A1 * | 5/2007 | Luffman | B64B 1/06 | 244/30 |
| 2011/0116905 A1 * | 5/2011 | Von Kessel | B64B 1/50 | 414/800 |
| 2014/0158823 A1 * | 6/2014 | Smith | B64B 1/44 | 244/1 A |
| 2015/0266559 A1 * | 9/2015 | Roach | B64B 1/42 | 244/31 |

\* cited by examiner

SUPERPRESSURE BALLOON ENVELOPE CAGE STRUCTURE AND RIGGING TECHNIQUE

CROSS REFERENCE TO RELATED APPLICATION

The present application is a continuation of U.S. patent application Ser. No. 13/941,674 filed on Jul. 15, 2013, the contents of which are incorporated herein by reference, as if fully set forth in this description.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

Disclosed herein are systems and methods for rigging and joining tendons of a balloon. A cage structure may be provided that contains a plurality of vertical tendons and one or more horizontal tendons. Each horizontal tendon may be attached to each of the vertical tendons at a certain level of the cage structure. A balloon envelope may then be inflated inside the cage of tendons so that the tendons may bear load for the balloon envelope while the balloon is in the air.

In one aspect, a balloon apparatus is provided having (1) a cage structure that includes (a) a plurality of vertical tendons, where each of the vertical tendons includes a first end and second end, where the first ends of the vertical tendons are all connected to one another and where the second ends of the vertical tendons are all connected to one another and (b) one or more horizontal tendons, where each horizontal tendon is attached to each of the vertical tendons at a corresponding level of the cage structure and (2) a balloon envelope, where the balloon envelop is arranged inside the cage structure and inflatable within the cage structure.

In another aspect, a cage structure is provided having (a) a plurality of vertical tendons, where each of the vertical tendons includes a first end and second end, where the first ends of the vertical tendons are all connected to one another and where the second ends of the vertical tendons are all connected to one another and (b) one or more horizontal tendons, where each horizontal tendon is attached to each of the vertical tendons at a corresponding level of the cage structure.

In a further aspect, a method is provided, which may include connecting a first end of each of a plurality of vertical tendons to one another, connecting a second end of each of the vertical tendons to one another, attaching one or more horizontal tendons to each of the vertical tendons, where each horizontal tendon is attached to each of the vertical tendons at a corresponding height of the vertical tendons, and inflating a balloon envelope inside the connected vertical and horizontal tendons.

In an additional aspect, example implementations may provide a system that includes means for connecting a first end of each of a plurality of vertical tendons to one another, means for connecting a second end of each of the vertical tendons to one another, means for attaching one or more horizontal tendons to each of the vertical tendons, where each horizontal tendon is attached to each of the vertical tendons at a corresponding height of the vertical tendons, and means for inflating a balloon envelope inside the connected vertical and horizontal tendons.

These as well as other aspects, advantages, and alternatives, will become apparent to those of ordinary skill in the art by reading the following detailed description, with reference where appropriate to the accompanying drawings.

DETAILED DESCRIPTION

Figure 1:
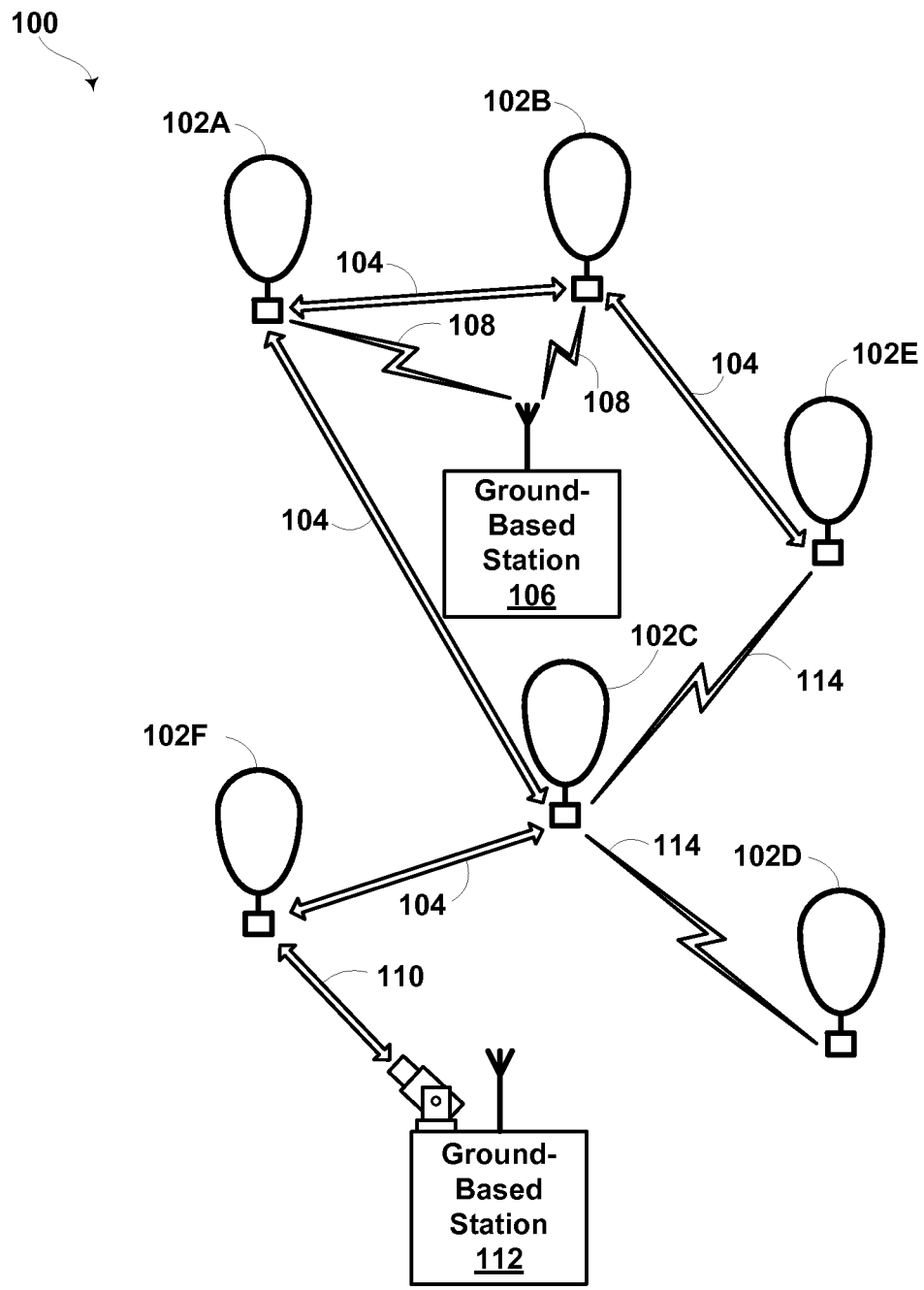
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

The envelopes of typical high-altitude balloons are constructed from non-load-bearing materials. Accordingly, additional support may be required for balloon envelopes to be able to maintain their shape while experiencing internal pressure relative to the atmosphere during flight. In some balloon envelopes, tendons or cords running from the base of the envelope to the apex, may be used to bear some of the load and help to maintain the shape of the envelope while the balloon is in air.

In some implementations, tendons may be held in place inside fabric sheaths built into the envelope. However, this design may be expensive to construct because the tendons may need to be built into the envelope at the time of construction. Alternatively, tendons may be taped to the surface of the envelope. Taping the tendons to the envelope may allow the envelope to be constructed more cheaply without having to build in tendons at the time of construction. However, tendons that have been affixed with tape may sometimes roll and shift out of place while the balloon is in the air. Additionally, taped tendons may separate from the envelope or rip or otherwise damage the envelope film.

Example embodiments provide for rigging techniques and designs that may allow for the inexpensive construction of balloons with tendons that maintain the shape of the balloon envelope during balloon flight. In some examples, a cage of tendons may be created using multiple vertical tendons that are each attached to one or more horizontal tendons. The top ends of the vertical tendons may be connected to one another. For example, the top ends of the vertical tendons may be connected to one another using a top plate. Additionally, the bottom ends of the vertical tendons may be connected to one another. For instance, the bottom ends of the vertical tendons may be connected to one another using a bottom plate.

Additionally, each of the horizontal tendons may be attached to each of the vertical tendons at a different level. As an example, three horizontal tendons may be used. One horizontal tendon may be attached to each of the vertical tendons at the midpoint of each of the vertical tendons. A second horizontal tendon may be attached to each of the vertical tendons halfway between the midpoint and the bottom of each of the vertical tendons. A third horizontal tendon may be attached to each of the vertical tendons halfway between the midpoint and the top of each of the vertical tendons. The connected tendons may then form a cage surrounding a balloon-like shape. Different numbers and arrangements of horizontal and vertical tendons may also be used.

In further examples, after a cage of tendons has been constructed, a balloon envelope may be inflated within the cage of tendons. The cage of tendons may then help to carry load and maintain the shape of the balloon envelope during balloon flight. In some examples, the cage of tendons may not be rigidly attached to the envelope, which may reduce the risk of the balloon envelope ripping or otherwise becoming damaged during flight. The vertical tendons may be held in place relative to each other without being rigidly attached to the balloon envelope because the vertical tendons may each be attached at one or more points to the horizontal tendons.

In an example embodiment, the vertical tendons may be straight fiber cables. In some examples, the straight fiber cables may contain an eyelet or opening at each level that a horizontal tendon will be used. For example, the eyelets may be holes that are punched into the straight fiber cables during construction. In an alternative example, the eyelets may be externally mounted on the cables after construction.

In further examples, the horizontal tendons may also be straight fiber cables. For example, a different horizontal straight fiber cable may be run through each of the eyelets at a certain level of each of the vertical tendons. A cage of tendons may therefore be formed by the connected vertical and horizontal straight fiber cables. In additional examples, braided ropes may be used as the horizontal tendons. For example, a different horizontal braided rope may be run through each of the eyelets at a certain level of each of the vertical tendons. In additional examples, the horizontal braided ropes may be tied to each of the eyelets of the vertical tendons using knots. For instance, clove-hitch knots may be used to affix the horizontal braided ropes to the eyelets on the vertical straight fiber cables.

In additional examples, the vertical tendons may be braided ropes. In some examples, openings within the braided ropes may be created at different levels during construction. The horizontal tendons may also be braided ropes that can be spliced through the openings in the vertical tendons. In further examples, each of the horizontal tendons may be attached to each of the vertical tendons using a knot such as a clove hitch. Additionally, a bar tack machine may be run across each of the intersections of two tendons, which may help to keep them in place while the balloon is in flight.

In some examples, the horizontal tendons may be attached to the vertical tendons at equally spaced points across the height of the balloon envelope. In alternative examples, more horizontal tendons may be attached to the vertical tendons at points in the top halves of the vertical tendons. It may be beneficial to have more horizontal tendons in the top half because the balloon envelope may be inflated from the top down. Accordingly, having more horizontal tendons in the top half may help to maintain the shape of the balloon envelope during inflation or during balloon flight. In an additional example, a top portion of the envelope may be connected to the cage of tendons and the bottom part of the envelope may be left to assume a proper shape within the cage of tendons during inflation.

In further examples, a cage of tendons for one or more balloons may be constructed during a first time period. The cages of tendons may then be joined to balloon envelopes (which may have been separately constructed) by inflating the envelopes inside the cages of tendons at a later time. Accordingly, manufacturing costs may be reduced by allowing the cages of tendons and the balloon envelopes to be separately constructed at different times. Other construction configurations are also possible.

2. Example Balloon Networks

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using lasers and/or ultra-bright LEDs (which are also referred to as "high-power" or "high-output" LEDs). In addition, the balloons may communicate with ground-based station(s) using radio-frequency (RF) communications.

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area.

Further, in some embodiments, some or all balloons may be continually moving while at the same time maintaining desired coverage over the ground (e.g., as balloons move out of an area, other balloons move in to take their place). In such an embodiment, a station-keeping process may in fact take the form of fleet-planning process that plans and coordinates the movement of the balloons. Other examples of station-keeping are also possible.

2c) Control of Balloons in a Balloon Network

Figure 2:
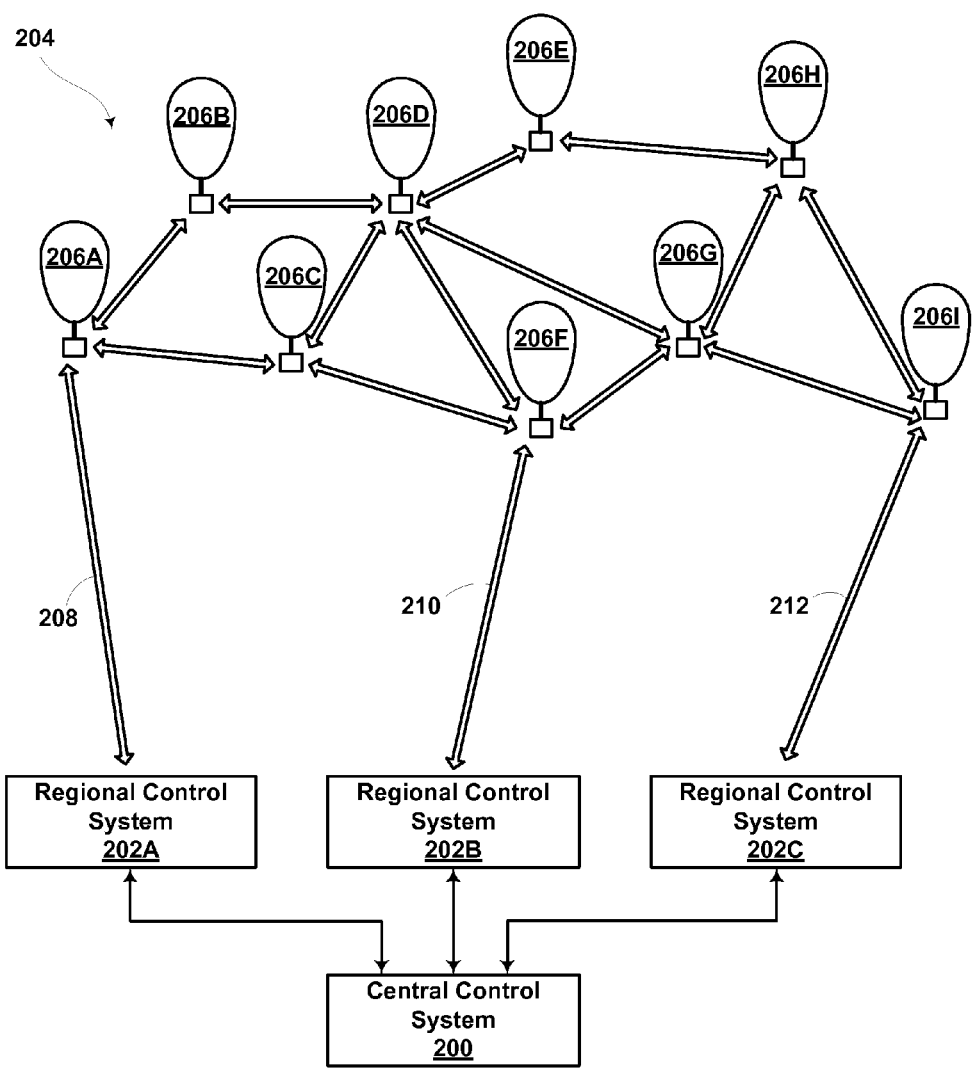
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

Further, control systems such as those described above may determine when and/or where individual balloons should be taken down. Additionally, the control systems may navigate the balloons to locations where they are to be taken down. The control systems may also cause the balloons to be taken down, and may control their descent and/or otherwise facilitate their descent.

2d) Example Balloon Configuration

Figure 3:
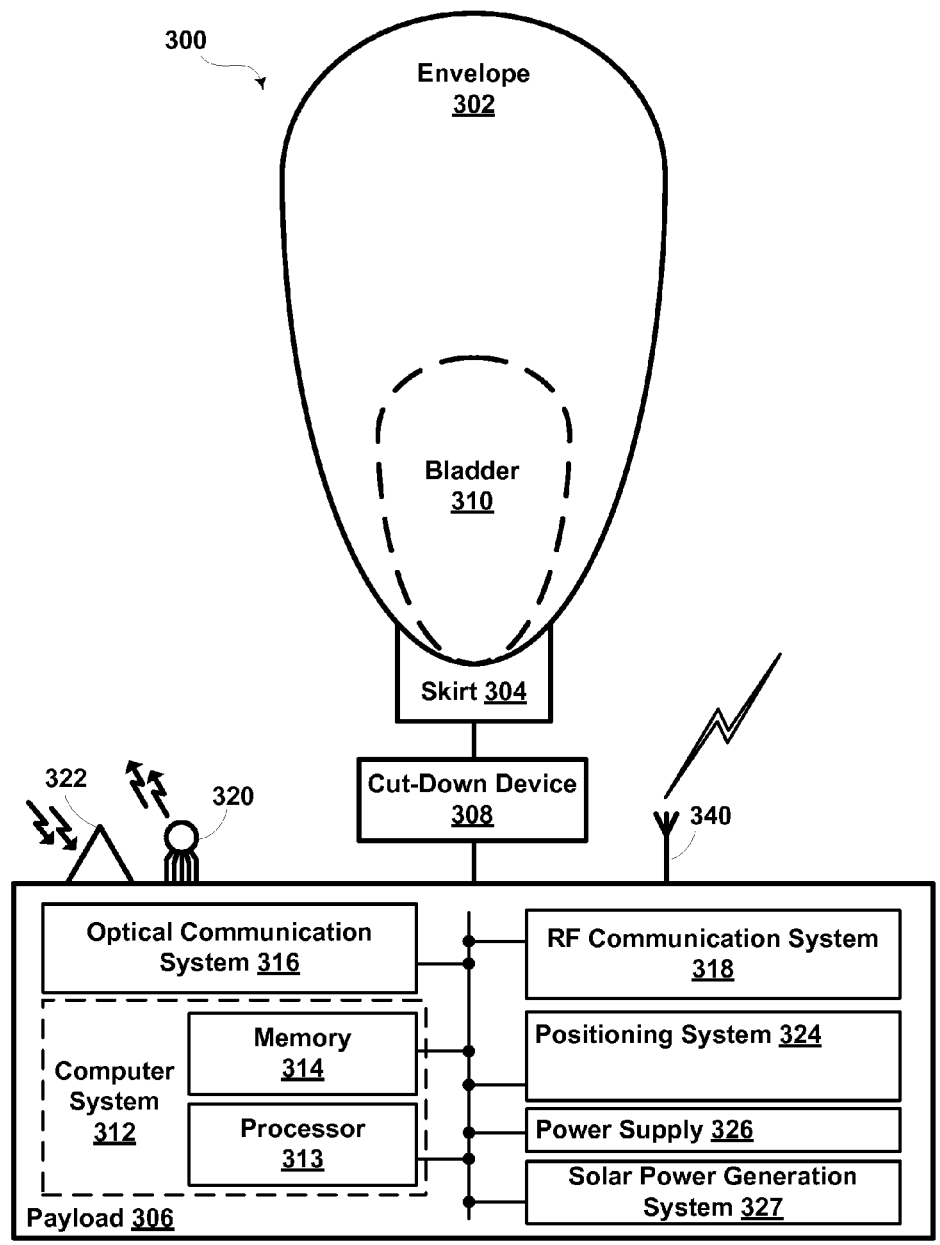
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein. Thus, processor 312, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter-than-air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

3. Providing a Cage of Tendons around a Balloon Envelope

As previously noted, high-altitude balloon envelopes may be constructed from materials such as polyethylene that do not hold much load while the balloon is floating in the air. Accordingly, additional support may be required to carry the load and to maintain the shape of the balloon envelope when the envelope experiences internal pressure relative to the atmosphere. In some examples, tendons may be run from the apex to the bottom of the balloon envelope in order to pick up the load. Furthermore, the tendons may need to be kept in place during balloon flight in order to continue to handle the load and maintain the shape of the balloon envelope.

In some examples, a cage of tendons consisting of multiple vertical tendons that are connected together by one or more horizontal tendons may first be constructed. Each horizontal tendon may be connected to each of the vertical tendons at a certain level, or height. Accordingly the vertical tendons may be held in place relative to one another by the one or more horizontal tendons. A balloon envelope may then be inflated the cage of connected vertical and horizontal tendons such that the tendons stay in place on top of the balloon envelope without being rigidly attached to the envelope. The tendons may then carry the load and help to maintain the shape of the balloon envelope during balloon flight.

Figure 5:
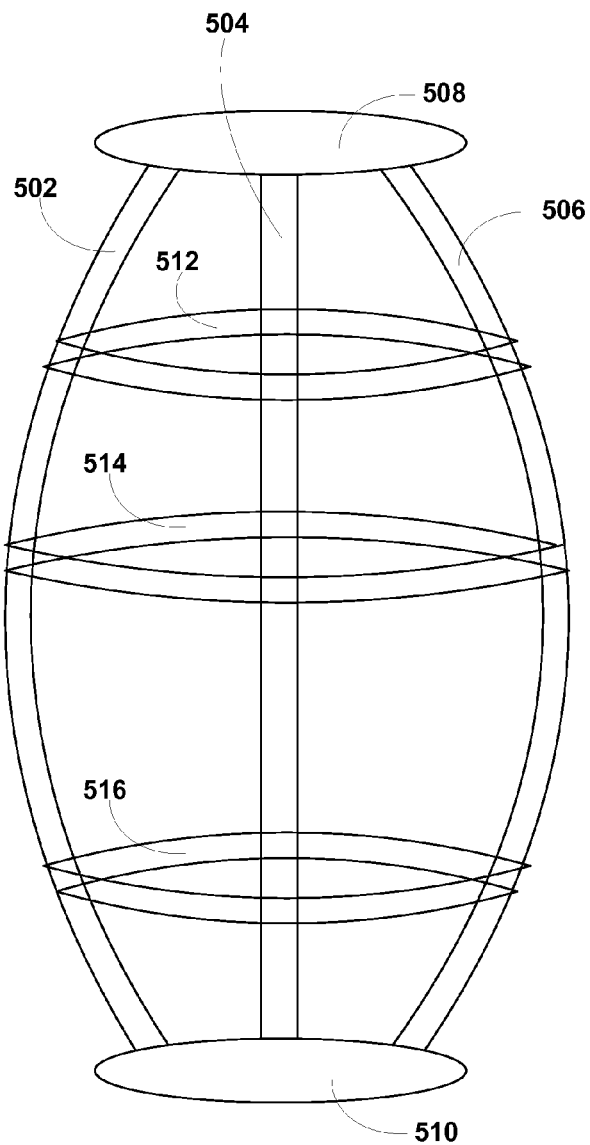
FIG. 5 shows a cage of tendons, according to an example embodiment.

FIG. 5 shows a cage of tendons, according to an example embodiment. Multiple vertical tendons 502, 504, 506 may first be positioned vertically and curved so that they surround a shape that will be filled by a balloon envelope. The shape could be a sphere, an ovoid, a pumpkin-like shape, or an egg-like shape, for example. Three vertical tendons 502, 504, 506 are shown here, but it should be understood that any number of vertical tendons could be used. In an example embodiment the vertical tendons could be equally spaced around the balloon shape.

The top end of each of the vertical tendons 502, 504, 506 may be connected to one another. For instance, a metal plate 508 may be used to connect the top end of each of the vertical tendons 502, 504, 506. In some examples, the top ends of the vertical tendons 502, 504, 506 may be fitted with a connective structure that allows them to be securely attached to the top plate 508. In alternative examples, the top ends of each of the vertical tendons may be connected to one another in other ways. For example, the top ends of the vertical tendons may be directly fastened together or a different type of connective structure could be used instead of a metal plate to hold the top ends of the tendons.

The bottom end of each of the vertical tendons 502, 504, 506 may also be connected to one another. For instance, a metal plate 510 may be used to connect the bottom end of each of the vertical tendons 502, 504, 506. In some examples, the bottom ends of the vertical tendons 502, 504, 506 may be fitted with a connective structure that allows them to be securely attached to the bottom plate 510. The bottom plate 510 may be the same size and shape as the top plate 508, or the bottom plate 510 may have a different size and/or shape. Additionally, the bottom ends of the vertical tendons may be connected to one another by other means as well.

One or more horizontal tendons 512, 514, 516 may be attached to each of the vertical tendons 502, 504, 506. In this example, three horizontal tendons 512, 514, 516 are shown. However, any number of horizontal tendons may be used. For example, just one horizontal tendon may be used around the equator of the shape. In further examples, five or seven horizontal tendons may be used.

Figure 6:
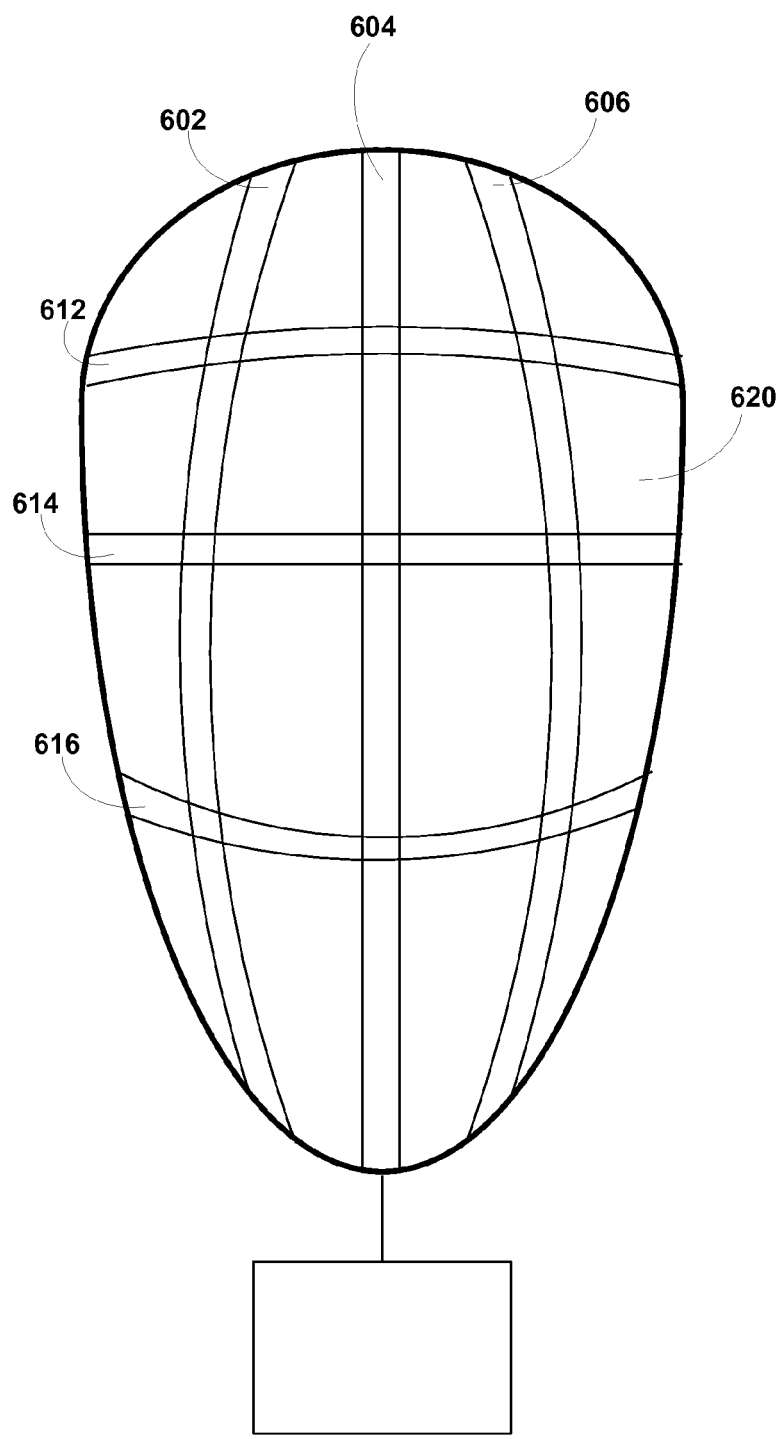
FIG. 6 shows a cage of tendons surrounding a balloon envelope, according to an example embodiment.

As shown, each horizontal tendon 512, 514, 516 may be attached to each of the vertical tendons 502, 504, 506 at a certain level or height of the vertical tendons 502, 504, 506. In some examples, the horizontal tendons may be attached to the vertical tendons at equally spaced points on the vertical tendons. In other examples, the horizontal tendons may be attached at points on the vertical tendons that are not equally spaced. For example, more horizontal tendons may be used in the top half of the shape because the balloon envelope may be inflated from the top down. Accordingly, having more tendons in the top half may be helpful to maintain the shape of the envelope during inflation and/or during balloon flight FIG. 6 shows a cage of tendons surrounding a balloon envelope, according to an example embodiment. As described above, a cage of tendons containing vertical tendons and horizontal tendons may first be constructed. In this example, three vertical tendons 602, 604, 606 and three horizontal tendons 612, 614, 616 are shown, but any number of vertical tendons and horizontal tendons could be used. The vertical tendons 602, 604, 606 may be connected to one another at the top ends, for example, by connecting each of the top ends of the vertical tendons 602, 604, 606 to a top metal plate. Additionally, the vertical tendons 602, 604, 606 may be connected to one another at the bottom ends, for example, by connecting each of the bottom ends of the vertical tendons 602, 604, 606 to a bottom metal plate.

A balloon envelope 620, such as a polyethylene balloon envelope, may then be inflated within the cage of tendons formed by the connected vertical tendons 602, 604, 606 and horizontal tendons 612, 614, 616. In some examples, the balloon envelope 620 may be inflated with sufficient lift gas such that the cage of tendons fits securely around the envelope. Accordingly, the vertical tendons 602, 604, 606 and the horizontal tendons 612, 614, 616 may carry the load for the balloon envelope 620 while the balloon is in the air.

In some examples, the balloon envelope 620 may not need to be rigidly attached to the cage of tendons. By keeping the tendons in place without rigidly attaching them to the balloon envelope, the risk of damage to the envelope from the tendons may be reduced. The vertical tendons 602, 604, 606 may be held in place relative to one another in part by using the horizontal tendons 612, 614, 616. For instance, the distance between the vertical tendon 602 and the vertical tendon 604 may be controlled at the levels of intersection with each of the horizontal tendons 612, 614, 616. By including additional horizontal tendons, the vertical tendons may be held in place more securely.

In example embodiments, the vertical tendons and the horizontal tendons may be constructed from different materials. In some cases, all the tendons may be made from the same materials. In other examples, the vertical tendons and the horizontal tendons may each be constructed from different materials. In further examples, different materials may be used for individual vertical tendons or individual horizontal tendons depending on the desired shape of the envelope and the amount of load that must be handled by the tendons.

In some examples, the vertical tendons may be straight fiber cables, such as cables made from high strength synthetic fibers. Straight fiber cables may provide an advantage in that they can be made lighter than similar strength braided lines or other possible tendon materials. In addition to weight savings, straight fiber cables may stretch less under load than alternative materials. Therefore, in some examples, straight fiber cables may absorb load more smoothly and reduce strain on the balloon envelope material, which may increase the survivability and reliability of the balloon envelope.

In the examples where the vertical tendons are straight fiber cables, the cables may be given eyelets, or openings, at each level where the vertical tendon may be attached to a horizontal tendon. Accordingly, the horizontal tendons can be fed through the opening at a given level in each of the vertical tendons in order to form the cage of tendons.

Figure 7A:
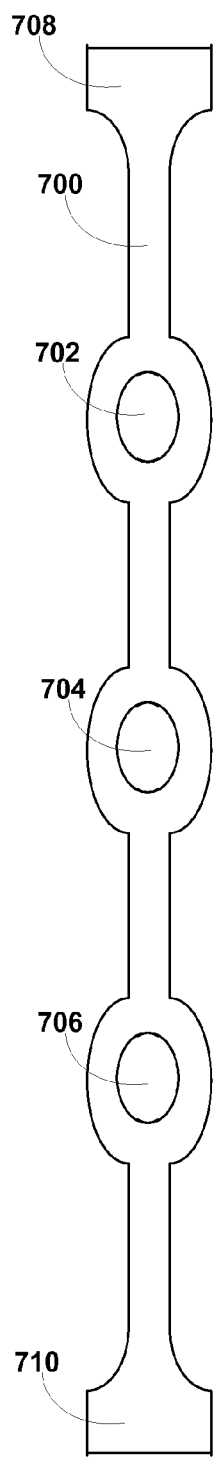
FIG. 7A shows a straight fiber cable with punched eyelets, according to an example embodiment.

In some examples, the eyelets may be built into the straight fiber cables when the cables are constructed. FIG. 7A shows a straight fiber cable with punched eyelets, according to an example embodiment. As shown, a straight fiber cable 700 may be constructed with eyelets 702, 704, 706 built into the cable at the time of construction. In this example, three eyelets are shown, but a different number could be used depending on the number of horizontal cables to be used. In some examples, the eyelets 702, 704, 706 may be equally spaced across the vertical cable 700. By building the eyelets in at the time construction, the connections with the horizontal cables may be more secure as there may be less risk of an eyelet breaking or separating from the cable. In some examples, the cable 700 may additionally include fittings at the top end 708 and the bottom end 710 that may allow the cable to be connected to the other vertical cables at the top and bottom of the envelope, such as by connecting each cable to a top plate and a bottom plate.

Figure 7B:
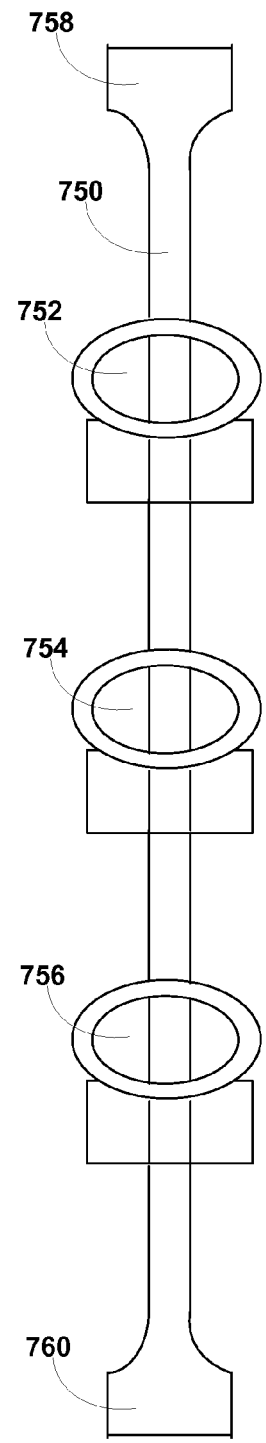
FIG. 7B shows a straight fiber cable with externally mounted eyelets, according to an example embodiment.

In additional examples, the eyelets may be externally mounted on the straight fiber cables. FIG. 7B shows a straight fiber cable with externally mounted eyelets, according to an example embodiment. Eyelets 752, 754, 756 may be attached to the straight fiber cable 750 by crimping, sewing, or lashing the eyelets to the cable, for example. Three eyelets 752, 754, 756 are shown here, but any number of eyelets may be used. The eyelets 752, 754, 756 may each include an opening large enough for a horizontal tendon to pass through. The eyelets 752, 754, 756 may be made from the same material as the straight fiber cables or from a different material such as metal. By externally mounting the eyelets on the cables, manufacturing of the different components of the balloon may be simplified by separating the construction of the balloon parts from the rigging of the eyelets. Additionally, the number of horizontal tendons may be changed at a time after the vertical tendons are constructed by adding additional externally mounted eyelets to the vertical cables. In some examples, the cable 750 may include fittings at the top end 758 and the bottom end 760 that may allow the cable to be connected to the other vertical cables at the top and bottom of the envelope, such as by connecting each cable to a top plate and a bottom plate.

Figure 8:
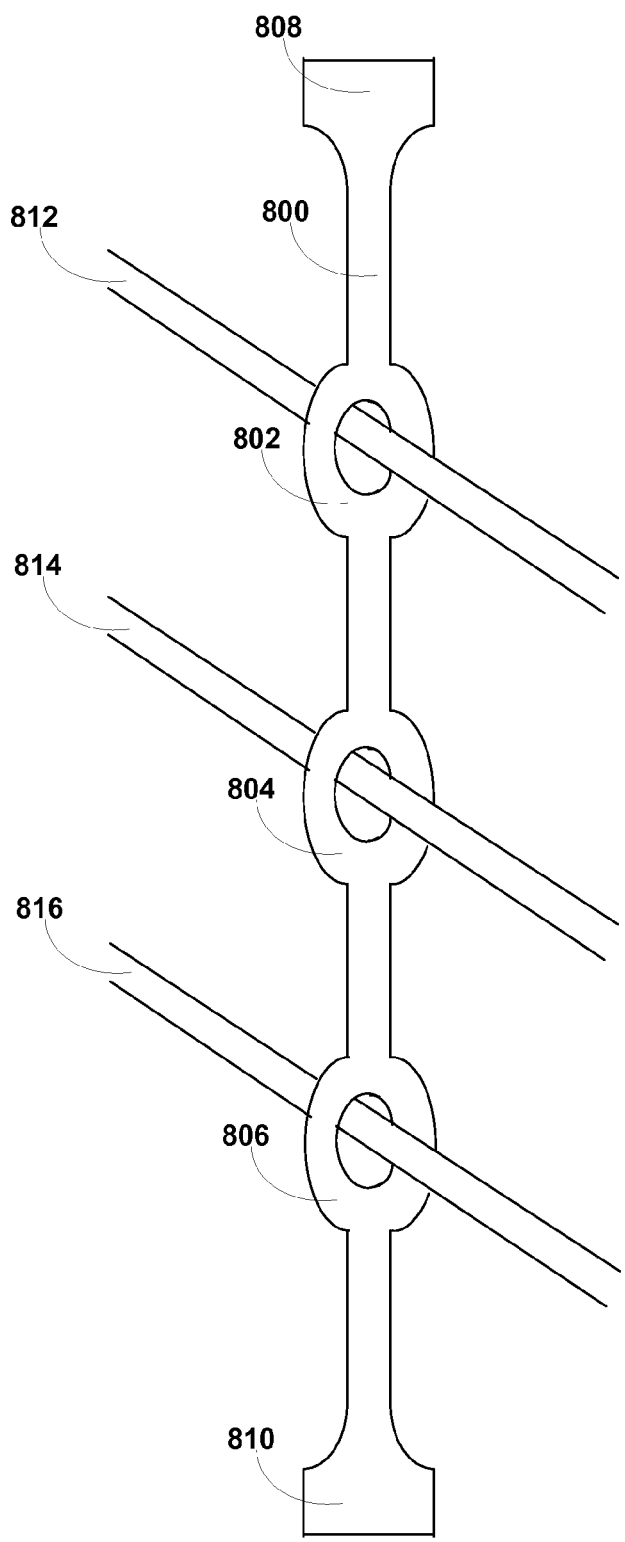
FIG. 8 shows horizontal straight fiber cables attached to a vertical straight fiber cable, according to an example embodiment.

In further examples, the vertical tendons may be straight fiber cables and the horizontal tendons may also be straight fiber cables. FIG. 8 shows horizontal straight fiber cables attached to a vertical straight fiber cable, according to an example embodiment. As described above, a vertical straight fiber cable 800 may first be constructed with openings, or eyelets 802, 804, 806, and with fittings 808, 810 on the ends. The eyelets could be built into the cable 800 as shown here or externally mounted on the cable 800. Horizontal cables 812, 814, 816 may then be passed through each of the eyelets 802, 804, 806. The horizontal cables may fit tightly through the openings or may be given some space in which to move. The horizontal cables may be constructed from material with sufficient give to allow the cables to bend in between consecutive eyelets.

Figure 9:
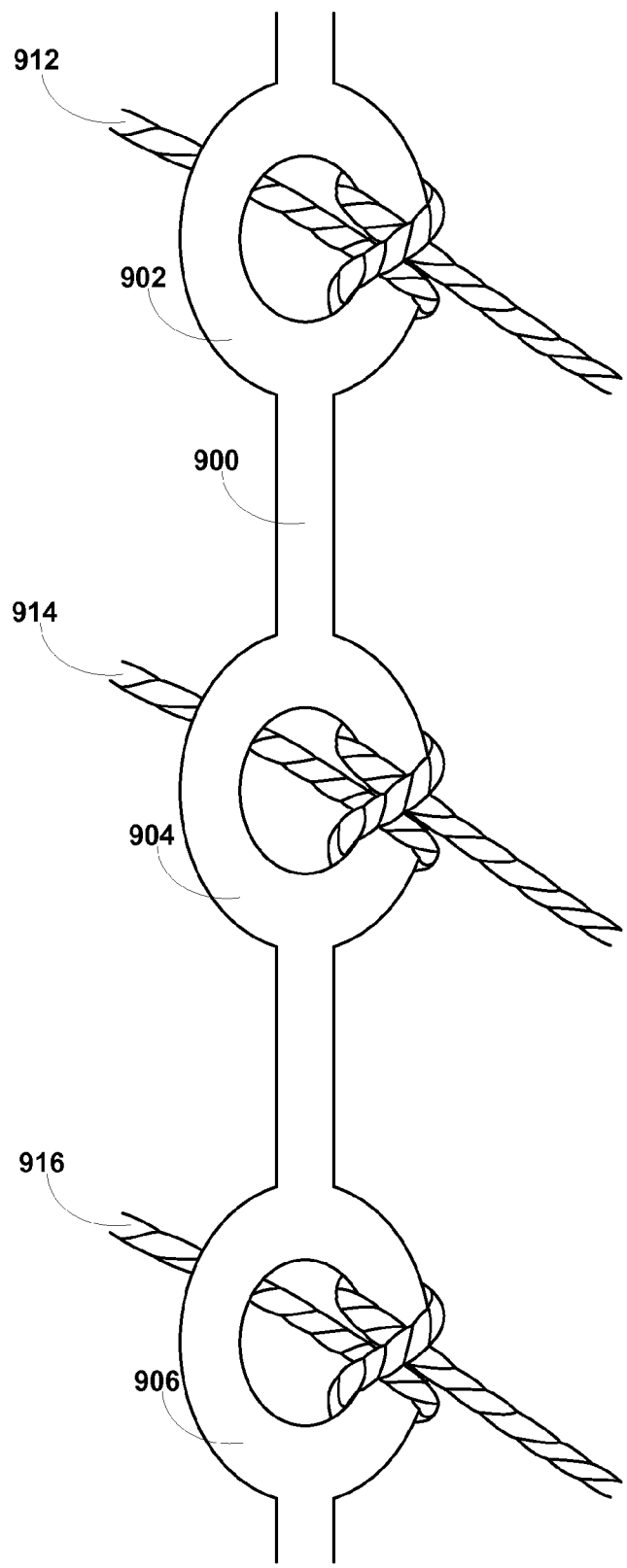
FIG. 9 shows horizontal braided ropes attached to a vertical straight fiber cable, according to an example embodiment.

In additional examples, the vertical tendons may be straight fiber cables and the horizontal tendons may be braided ropes. FIG. 9 shows horizontal braided ropes attached to a vertical straight fiber cable, according to an example embodiment. Horizontal braided ropes 912, 914, 916 may be passed through eyelets 902, 904, 906 in a vertical straight fiber cable 900. The eyelets 902, 904, 906 could be built in to the cable 900 as shown or they could be externally mounted on the cable 900. Additionally, as shown, in some examples, the horizontal braided ropes 912, 914, 916 may be attached to the eyelets 902, 904, 906 using a knot, such as a clove-hitch knot, which may create a more secure attachment. Braided ropes may allow for more stretch under load than straight fiber cables. Accordingly, it may be advantageous to combine straight fiber cables with braided ropes in some examples.

Figure 10:
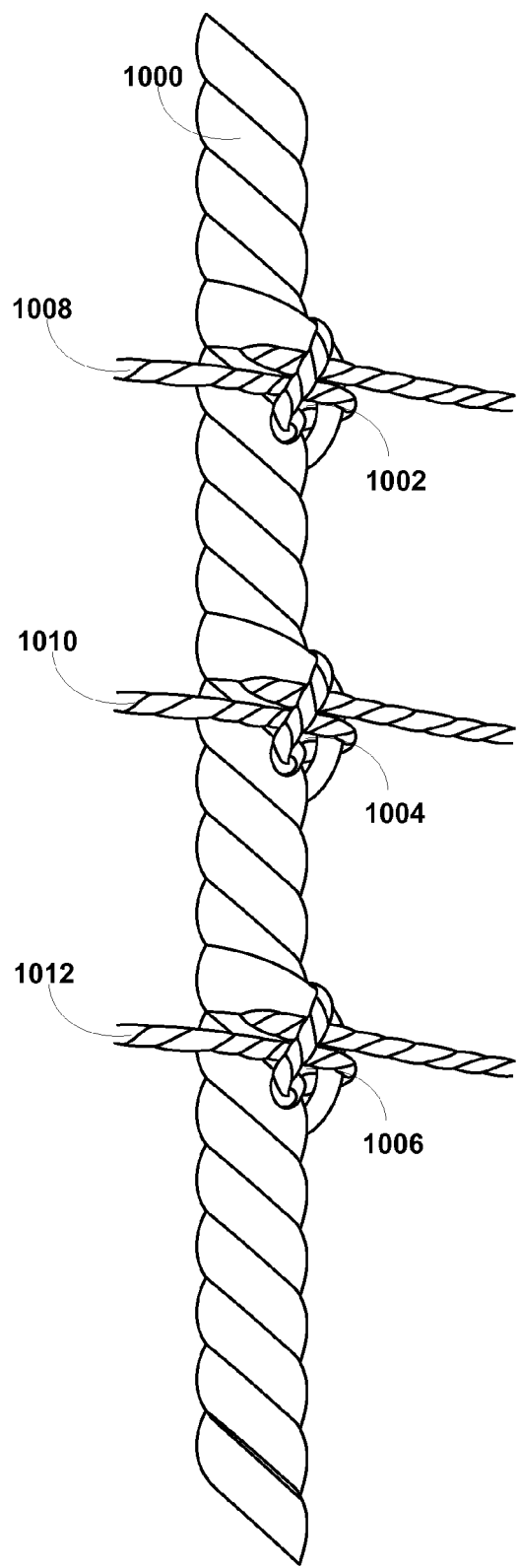
FIG. 10 shows horizontal braided ropes attached to a vertical braided rope, according to an example embodiment.

In further examples, both the vertical tendons and the horizontal tendons may be braided ropes. FIG. 10 shows horizontal braided ropes attached to a vertical braided rope, according to an example embodiment. As shown, braids may be opened within a vertical braided rope 1000 at different levels 1002, 1004, 1006. These openings may be created when the rope is manufactured. Horizontal braided ropes 1008, 1010, 1012 may then be fed through the openings. In some examples, the horizontal braided ropes 1008, 1010, 1012 may also be connected to the vertical braided ropes 1002, 1004, 1006 using a knot such as a clove hitch. Additionally, a bar tack machine may be run across the each of the intersections of two braided ropes, which may help to keep them in place while the balloon is in flight. Other types of material may be used for the vertical and/or horizontal tendons as well.

Figure 4:
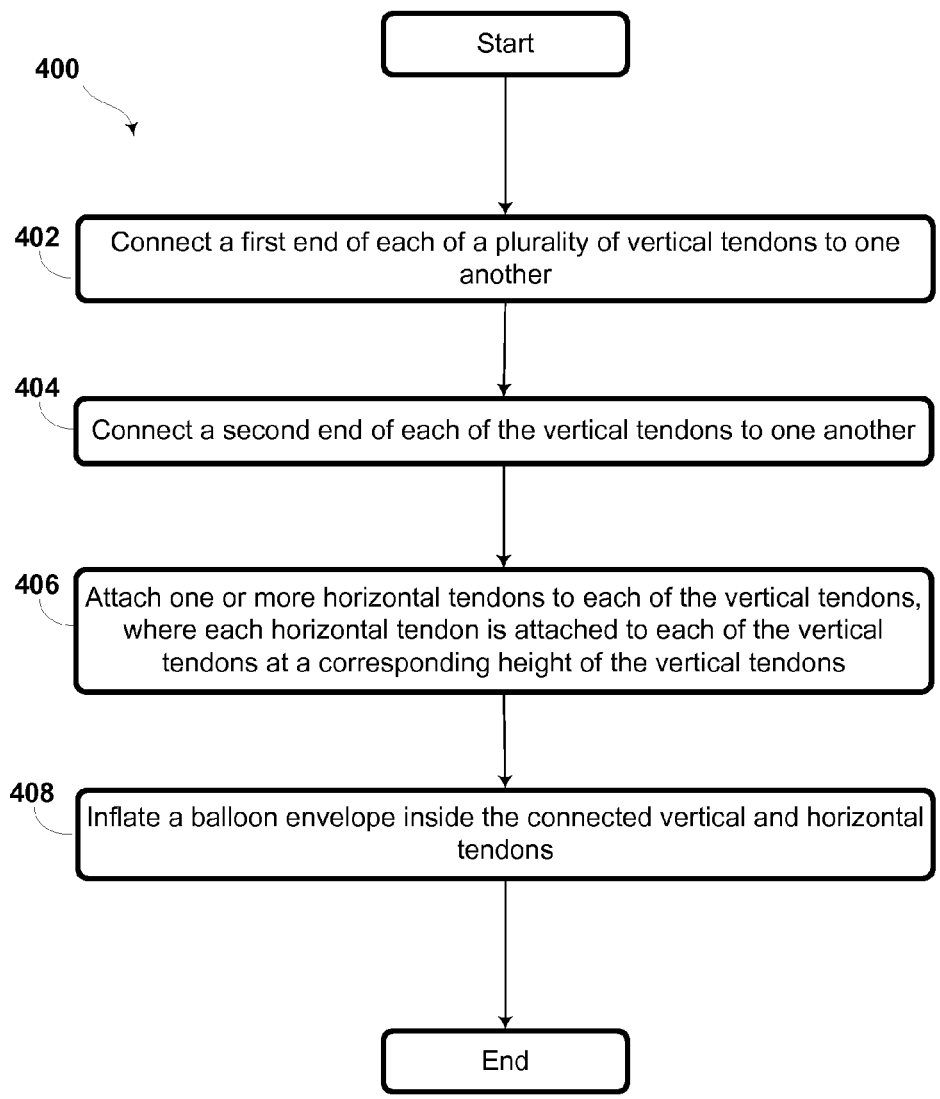
FIG. 4 shows a method, according to an example embodiment.

FIG. 4 shows a method, according to an example embodiment. The method 400 may involve connecting a first end of each of a plurality of vertical tendons to one another, for example, by using a metal plate, as shown by block 402. The method 400 may further involve connecting a second end of each of the vertical tendons to one another, for example, by using a second metal plate, as shown by block 404. The method 400 may additionally involve attaching one or more horizontal tendons to each of the vertical tendons, where each horizontal tendon is attached to each of the vertical tendons at a corresponding height of the vertical tendons, as shown by block 406. The method 400 may also involve inflating a balloon envelope inside the attached vertical and horizontal tendons, as shown by block 408.

It should be understood that the functions of method 400 could be combined, carried out in a different order, and/or separated into additional parts. Further, the functions of method 400 could be completed at different times as well. For example, the vertical and horizontal tendons for many balloons may be constructed during a first time period. The vertical and horizontal tendons may be attached together to form cages during a second time period. And balloon envelopes may be inflated within the cages of tendons during a third period. Other orderings and combinations are also possible.

By separating the manufacturing of the load-bearing tendons from the rigging and joining with balloon envelopes, large numbers of balloons may be manufactured and rigged in parallel, which may allow for efficient large scale deployment. Accordingly, an additional advantage of separately creating connected tendon structures may be substantial cost savings when manufacturing and deploying networks that may contain as many as hundreds or thousands of high-altitude balloons.

CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A balloon apparatus comprising:
a cage structure comprising:
(a) a plurality of vertical tendons, wherein each of the vertical tendons comprises a fiber cable with a first end and a second end, wherein the first ends of the vertical tendons are all connected to one another and wherein the second ends of the vertical tendons are all connected to one another, and wherein each vertical tendon comprises an opening at each level corresponding to a horizontal tendon; and
(b) one or more horizontal tendons, wherein each horizontal tendon comprises a fiber cable that is attached to each of the vertical tendons at a corresponding level of the cage structure by passing through the opening of each vertical tendon at the corresponding level; and
a balloon envelope, wherein the balloon envelope is arranged inside the cage structure and inflatable within the cage structure.

2. The balloon apparatus of claim 1, further comprising a top plate and a bottom plate, wherein the first ends of the vertical tendons are all connected to one another using the top plate and the second ends of the vertical tendons are all connected to one another using the bottom plate.

3. The balloon apparatus of claim 1, wherein the balloon envelop is not rigidly attached to the cage structure.

4. The balloon apparatus of claim 1, comprising three horizontal tendons.

5. The balloon apparatus of claim 4, wherein the three horizontal tendons comprise:
a first horizontal tendon attached to each of the vertical tendons at a midpoint of each of the vertical tendons;
a second horizontal tendon attached to each of the vertical tendons halfway between the midpoint and a bottom end of each of the vertical tendons; and
a third horizontal tendon attached to each of the vertical tendons halfway between the midpoint and a top end of each of the vertical tendons.

6. The balloon apparatus of claim 1, wherein the horizontal tendons correspond to levels at equally spaced points on the vertical tendons.

7. The balloon apparatus of claim 1, wherein the horizontal tendons correspond to levels that are not equally spaced on the vertical tendons such that more horizontal tendons are attached at points in top halves of the vertical tendons.

8. A balloon apparatus comprising:
a cage structure comprising:
(a) a plurality of vertical tendons, wherein each of the vertical tendons comprises a fiber cable with a first end and a second end, wherein the first ends of the vertical tendons are all connected to one another and wherein the second ends of the vertical tendons are all connected to one another, and wherein each vertical tendon comprises an opening at each level corresponding to a horizontal tendon; and
(b) one or more horizontal tendons, wherein each horizontal tendon comprises a fiber cable that is attached to each of the vertical tendons at a corresponding level of the cage structure by passing through the opening of each vertical tendon at the corresponding level; and
wherein the connected vertical and horizontal tendons surround a space fillable by a balloon envelope when the balloon envelope is inflated.

9. The balloon apparatus of claim 8, further comprising a top plate and a bottom plate, wherein the first ends of the vertical tendons are all connected to one another using the top plate and the second ends of the vertical tendons are all connected to one another using the bottom plate.

10. A method comprising:
connecting a first end of each of a plurality of vertical tendons to one another, wherein each vertical tendon comprises a fiber cable, and wherein each vertical tendon comprises an opening at each level corresponding to a horizontal tendon;
connecting a second end of each of the vertical tendons to one another;
attaching one or more horizontal tendons to each of the vertical tendons, wherein each horizontal tendon comprises a fiber cable that is attached to each of the vertical tendons at a corresponding height of the vertical tendons by passing each horizontal tendon through the opening of each vertical tendon at the corresponding level; and
inflating a balloon envelope inside the connected vertical and horizontal tendons.

11. The method of claim 10, wherein:
connecting the first end of each of the vertical tendons to one another comprises connecting the first end of each of the vertical tendons to a top plate; and connecting the second end of each of the vertical tendons to one another comprises connecting the second end of each of the vertical tendons to a bottom plate.

12. The method of claim 10, wherein:

attaching the one or more horizontal tendons to each of the vertical tendons occurs during a first time period;

inflating the balloon envelope inside the connected vertical and horizontal tendons occurs during a second time period; and the second time period begins at a time after the first time period ends.

* * * * *